United States Patent
Güney Ayana (10) Patent No.: US 9,505,597 B2
(45) Date of Patent: Nov. 29, 2016

(54) ROTATABLE LOAD-BEARING TOP PLATE FOR JACKS

(75) Inventor: Cem Güney Ayana, Eskisehir (TR)

(73) Assignee: ARIKAN KRIKO VE MAKINA SANAYI TICARET ANONIM SIRKETI, Eskisehir (TR)

( * ) Notice: Subject to any disclaimer, the term of this patent is extended or adjusted under 35 U.S.C. 154(b) by 61 days.

(21) Appl. No.: 13/809,634

(22) PCT Filed: Mar. 23, 2012

(86) PCT No.: PCT/TR2012/000056
§ 371 (c)(1),
(2), (4) Date: Jun. 24, 2014

(87) PCT Pub. No.: WO2013/077816
PCT Pub. Date: May 30, 2013

(65) Prior Publication Data
US 2014/0299825 A1    Oct. 9, 2014

(30) Foreign Application Priority Data

Nov. 4, 2011 (TR) ................ a 2011 11079

(51) Int. Cl.
*B66F 13/00* (2006.01)
*B66F 3/12* (2006.01)
*F16M 11/12* (2006.01)

(52) U.S. Cl.
CPC ............... *B66F 13/00* (2013.01); *B66F 3/12* (2013.01); *F16M 11/12* (2013.01)

(58) Field of Classification Search
CPC ............ B66F 13/00; B66F 3/10; B66F 3/12; B66F 3/16
See application file for complete search history.

(56) References Cited

U.S. PATENT DOCUMENTS

| | | | | |
|---|---|---|---|---|
| 4,068,961 A | * | 1/1978 | Ebner | F16C 11/0661 248/181.1 |
| 4,473,206 A | * | 9/1984 | Stillinger | F16M 11/14 248/346.06 |
| 4,695,036 A | | 9/1987 | Yukimoto et al. | |
| 5,012,879 A | | 5/1991 | Bienek et al. | |
| 5,664,762 A | * | 9/1997 | Rothbauer | B66F 3/16 254/101 |
| 6,024,336 A | * | 2/2000 | Lin | F16M 11/12 248/371 |
| 6,347,779 B1 | | 2/2002 | Korin | |
| 2011/0155978 A1 | | 6/2011 | Arghami Nia | |

* cited by examiner

FOREIGN PATENT DOCUMENTS

GB    980024 A    1/1965

OTHER PUBLICATIONS

International Search Report for corresponding International Application No. PCT/TR2012/000056s.

*Primary Examiner* — Monica Carter
*Assistant Examiner* — Seahee Yoon
(74) *Attorney, Agent, or Firm* — Egbert Law Offices, PLLC (57) ABSTRACT

A load-bearing top plate which provides contact with a vehicle chassis by means of a bearing plate and is the part of a jack employed in cars and other vehicles for hoisting heavy loads to a certain small height or moving bodies at rest for a short distance exerting high pressure on them. It is characterized in that it has a lower piece, and a upper piece which is in contact with the vehicle and enables intended position of the aforementioned rotatable load-bearing top plate by first rotating over the aforesaid lower piece and then locking. One pin connects the aforementioned lower piece and upper piece. A pushing element is inserted around the aforesaid pin.

5 Claims, 6 Drawing Sheets

ROTATABLE LOAD-BEARING TOP PLATE FOR JACKS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention relates to rotatable load-bearing top plate which is the load hearing part of the sacks employed for lifting vehicles and loads and this invention can be easily employed at every jacking points of the same vehicle since it has such capability that it swivels, fits, and locks itself into the differing forms of those points on the vehicle.

2. Description of Related Art Including Information Disclosed Under 37 CFR 1.97 and 37 CFR 1.98.

People, parallel to the development in the technology, have developed various lifting and conveying equipments which will provide services for lifting and/or conveying loads. In this way, requirement for manpower has been reduced and speed of the studies in this field is increased. There are many lifting and/or conveying equipments such as pulleys, lifting jacks, hoists, cranes and so on.

Lifting jacks are such tools that they are employed for hoisting heavy loads to a certain small height or moving bodies at rest for a short distance exerting high pressure on them. Low capacity lifting jacks are used with the machining equipments and vehicles and those with high capacity are used with heavy machinery and to handle other loads.

Lifting jacks are divided into two categories as hydraulic types and mechanical types. Mechanical lifting jacks have several types; such as screw-jacks, rack-and-pinion jacks, . . . Hydraulic jacks also have several types; such as hydraulic bottle jack, horizontal motor hydraulic jack, . . .

Load bearing plates for load of the lifting jacks employed today are generally so designed that they only fit to some specific surface forms. However, in most cases jacking points during lifting vehicles or loads have different forms and lifting jacks engaged in these jacking points must conform to them. Existing technical solutions are either using more than one type of attachable load bearing plates for different jacking points or using more than one type of lifting jacks.

Besides, in the course of time, user may lose the load bearing plate attachments supplied as well as use of many attachments increases the lifting jack production expenses. In addition to that disassembling and assembling of these parts take time and require special tools and equipments. It is obvious that use of more than one lifting jack increases the cost and storing these lifting jacks means that you have more trouble sources.

Nowadays, it is known that there are a lot of applications with regard to lifting jacks with swivel top plate. One of these applications relates to a lifting jack with swivel ramp describe d in the application numbered U.S. Pat. No. 6,347,779B1. In the abstract issued of this application, it says that a pair of splines with helical ramps are used for extension or retraction by means of rotating them over each other.

As a result, load bearing top plates of lifting jacks used for lifting vehicles and loads are recently keep on developing, and therefore it seems that new structures are required to remove the disadvantages that have been already discussed above and provide solutions to the existing systems.

BRIEF SUMMARY OF THE INVENTION

Present invention relates to rotatable load-bearing top plate which satisfies the requirements described previously, eliminates all disadvantages and provides some additional advantages too.

One purpose of the invention is that it is made possible that lifting jack can be easily and practically applied to different points of a vehicle since the system designed as load bearing top plate can perform swiveling motion.

Another purpose of the invention is to provide a proper slot for jacking point located in front of the vehicle with a cylindrical recess positioned at the upper bearing plate of rotatable load-bearing top plate.

Another purpose of the invention is that lifting jack can be applied (positioning the jack between ground and a jacking-point or any suitable surface on the vehicle) to the jacking point located at the rear axle as well, since there are lugs provided on the upper surface.

Because of rotatable load-bearing top plate consisting of such integral parts as one lower piece and one upper piece with swiveling capability, it is intended that lifting jack should be used at more than one jacking points and thus, use of more than one lifting top plates or lifting jacks for these points are not required as in the case of the existing technology.

Another purpose of the invention is that because of two V-channel forms provided at both ends of lower piece, swivel of upper piece under loaded conditions is prevented and it is locked.

In order to realize all advantages that have been previously discussed and will be understood with the detailed description below, the invention relates to a rotatable load-bearing top plate which bears the vehicle and comes into contact with vehicle chassis and is the a part of a lifting jack employed in the cars and other vehicles, and for hoisting heavy loads to a certain small height or moving bodies at rest for a short distance exerting high pressure on them; and it is characterized by that it consists of a lower piece, and a upper piece which is in contact with the vehicle and enables intended position of the aforementioned rotatable load-bearing top plate by rotating over the aforesaid lower piece, and one pin which connects the aforementioned lower piece and upper piece, and pushing element which is inserted around the aforesaid pin.

In one of the favorite application of the invention, there are respectively upper centering slot, lower centering slot and pin hole which are located one after the other and getting smaller in size in a decreasing order on the upper surface of the aforementioned lower piece that is in contact with the upper supports of lifting jack.

In another preferred application of the invention, there are V-ridge forms at both ends of the upper surface.

In another preferred application of the invention, there are at least two lugs hanging out of the aforementioned upper surface.

In another preferred applications of the invention, there are holes provided for assembling on the side walls.

In another preferred application of the invention, at both ends of the upper surface there are V-ridges available to limit the swiveling motion and to sort of lock the system by providing stepwise transition.

In another preferred application of the invention, there are upper cylindrical slot, lower cylindrical slot and pin hole which are positioned one after the other and getting smaller in size in a decreasing order on the aforementioned upper piece to be centered by inserting into the aforementioned lower piece.

In another preferred application of the invention, there are two lugs extending upward at both ends of the upper piece.

In another preferred application of the invention, there are two lugs provided for each surface at the sides of upper piece.

In another preferred application of the invention, there are slots available at both surfaces of the upper piece.

In another preferred application of the invention, there is a special form of slot where aforementioned lugs can be placed to the sections in the form of V-ridge belonging to the lower piece.

In another preferred application of the invention, pushing element is a spring.

Structural properties, characteristics and all advantages of the invention will be more clearly understood with such means as the figures provided below and detailed description written by referencing to these figures, and assessment should be made by taking these figures and detailed descriptions into consideration.

BRIEF DESCRIPTION OF THE SEVERAL VIEWS OF THE DRAWINGS

Present invention must be assessed in company with the figures described below in order for configuration and its advantages together with its supplementary elements of the invention to be clearly understood.

REFERENCE NUMERALS

1. Jack
2. Underlying
3. Lower supports
4. Upper supports
5. Gear shaft
6. Support joining element
7. Fastening element
10. Load-Bearing Top Plate
20. Upper Piece
21. Upper cylindrical slot
22. Lower cylindrical :slot
23. Pin hole
24. Upper plate lug
25. Lug
26. Slot
30. Lower Piece
31. Lug
32. Holes
33. Upper surface
34. V-ridge
35. Upper centering slot
36. Lower centering slot
37. Pin hole
38. Ridge
40. Pin
50. Pushing element

DETAILED DESCRIPTION OF THE INVENTION

Figure 1:
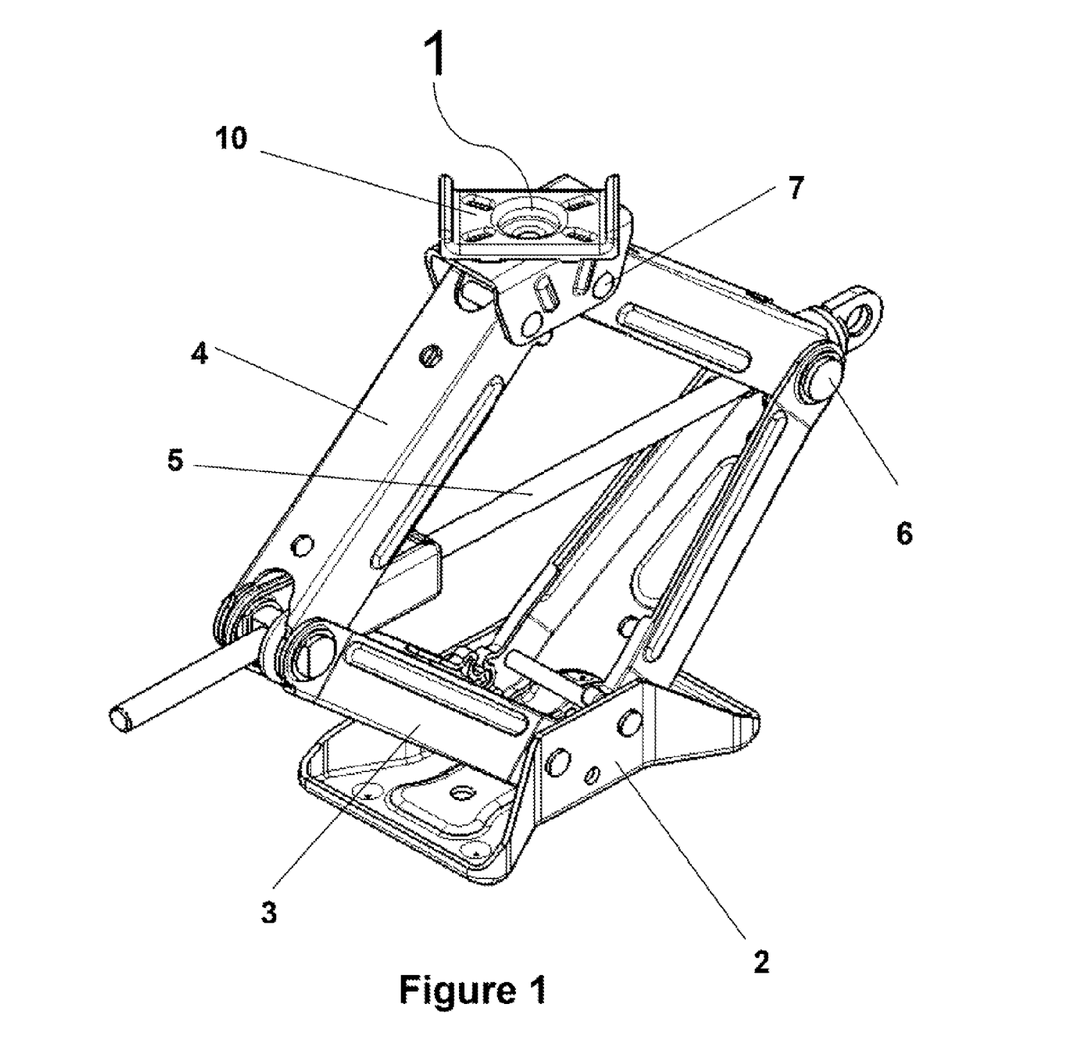
FIG. 1: Perspective view from the front, representing the said rotatable load-bearing top plate as assembled on jack.

In this detailed description, preferred configurations of the aforesaid rotatable load-bearing top plate (10) are described only for the purpose of explaining the subject more clearly and in such a way that it will provide no restriction. In the FIG. 1, perspective view from the front, representing the said swivel top plate system (10) as assembled cm lifting jack (1) is shown.

The said rotatable load-bearing top plate (10) is located at the upper section of jack (1) where it comes in contact with the vehicle chassis. In the configuration of lifting jack (1) shown on the FIG. 1, there is an underlying (2) which facilitates the floor contact. Mentioned underlying (2) is a steel sheet preferably made from a metallic material. There is lower support (3) mutually connected with each other with a certain angle at the left and right, and also connected with the mentioned underlying (2). There are upper supports (4) available located against the mentioned lower supports (3) and also symmetrical to the mentioned lower supports (3). Aforementioned lower supports (3) and upper supports (4) are mounted with each other by means of support joining element (6). Mentioned support joining element (6) mentioned here is preferably a dowel. There is a gear shaft (5) which enables the operation of joint and lifting jack (1) at the point where mentioned lower support (3) and upper support (4) are connected to each other. The said rotatable load-bearing top plate (10) is mounted to the place that lifting jack (1) comes in contact with vehicle during lifting operation at the point where the mentioned upper supports (4) are joined. After the said rotatable load-bearing top plate (10) is mounted to the lifting jack (1), installation is completed with the fastening elements (7) which should be preferably rivet.

Figure 2:
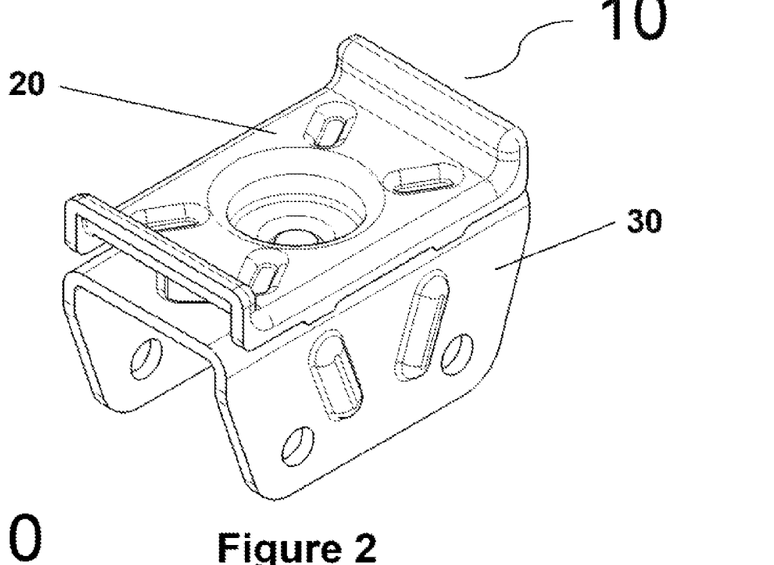
FIG. 2: 3-dimensional view of the upper piece and lower piece for the said rotatable load-bearing top plate.
Figure 3:
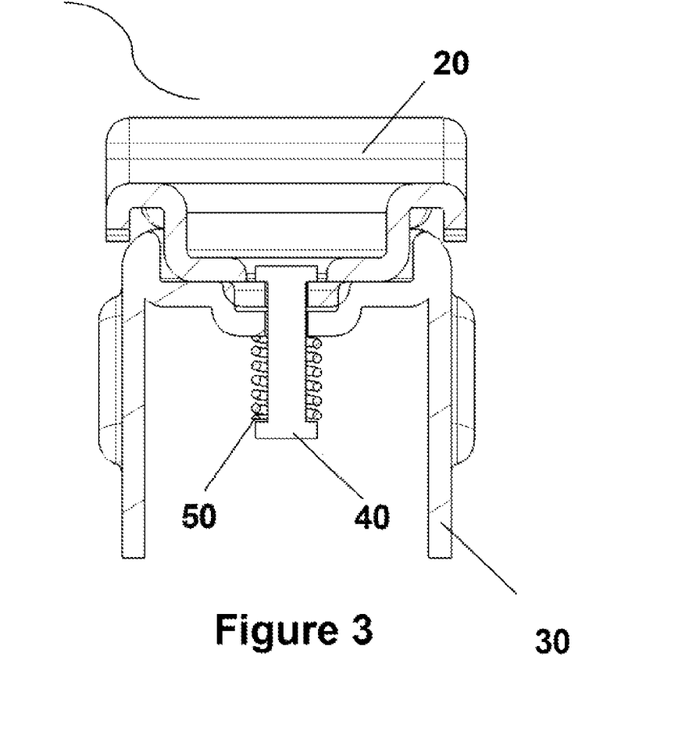
FIG. 3: Cross-sectional view of the said rotatable load-bearing top plate in profile.

The said rotatable load-bearing top plate (10) mainly comprises of four major parts. These parts include upper piece (20) which comes contact with a vehicle, lower piece (30) connected to upper support (4), a pin (40) which holds the mentioned upper piece (20) and lower piece (30) together and an pushing element (50) which facilitates the movement of the mentioned upper piece (20) and lower support (30) relative to each other and locks them. 3-dimensional view of the upper support (20) and lower piece (30), which are major parts of the invention is shown in the FIG. 2. In the FIG. 3, 3-dimensional view of rotatable load-bearing top plate (10) in profile, as well as upper piece (20) and lower piece (30), the pin (40) which centers those two parts and pushing element (50) are also shown.

Figure 4:
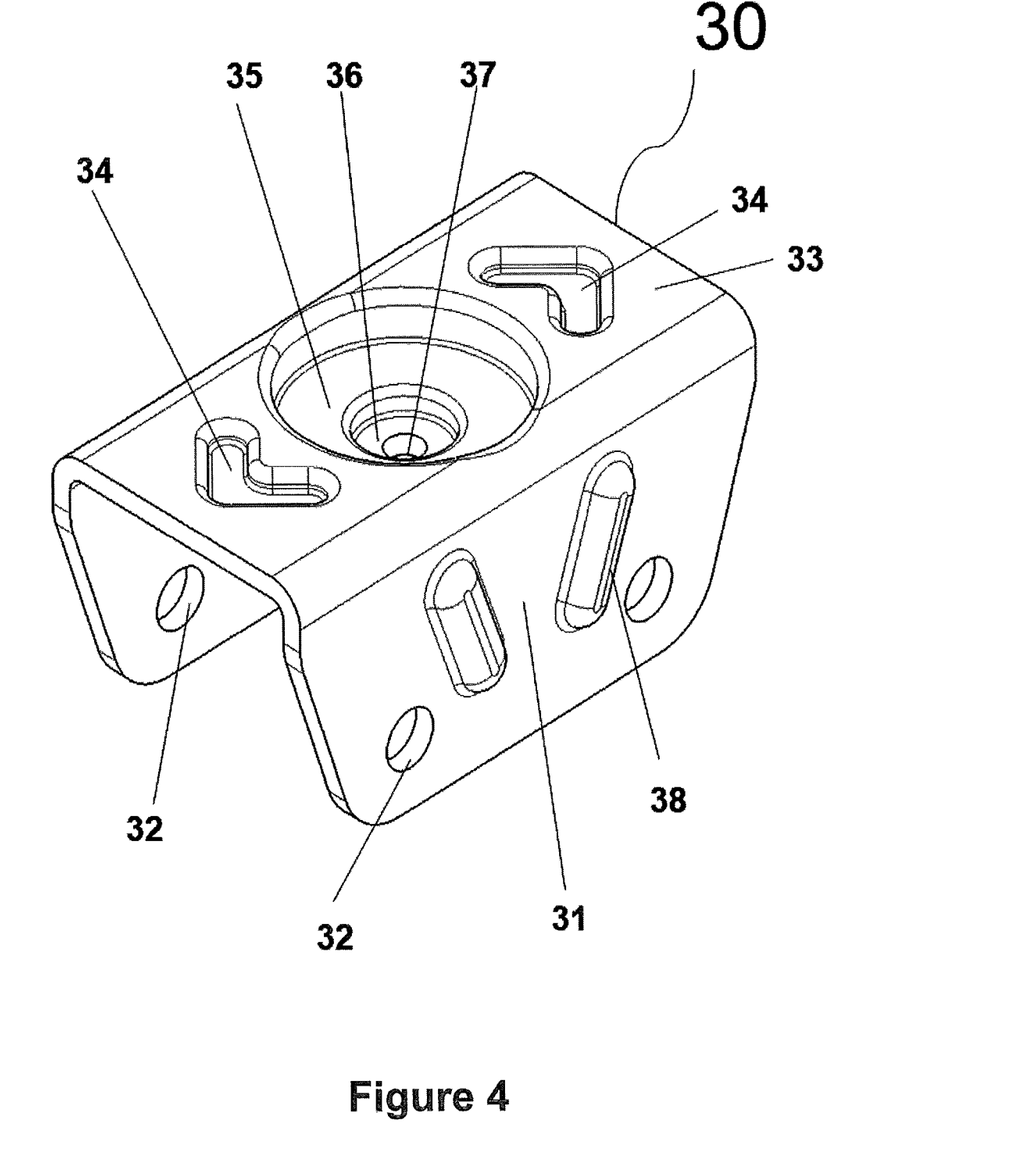
FIG. 4: 3-dimensional view of the upper piece of the said rotatable load-bearing top plate.

One of the major integral part, lower piece (30) is formed by bending a flat steel sheet. 3-dimensional view of the lower piece (30) is taken place in FIG. 4. Mentioned lower piece (30) includes an upper surface (33) which structurally has various forms on it and two lugs (31) hanging out of the mentioned upper surface. On the mentioned side lusgs (31) there are totally four installation holes (32) being two of them at each side walls, to which upper arm and the said rotatable load-bearing top plate (10) are mounted. There are cylindrical slots which are positioned one after the other and net smaller in size consecutively in the and section of the upper surface (33). They are, in succession, upper centering slot (35), lower centering slot (36) and pin hole. There are V-ridges (34) and ridge (38) provided at both ends of the upper surface (33).

Figure 5:
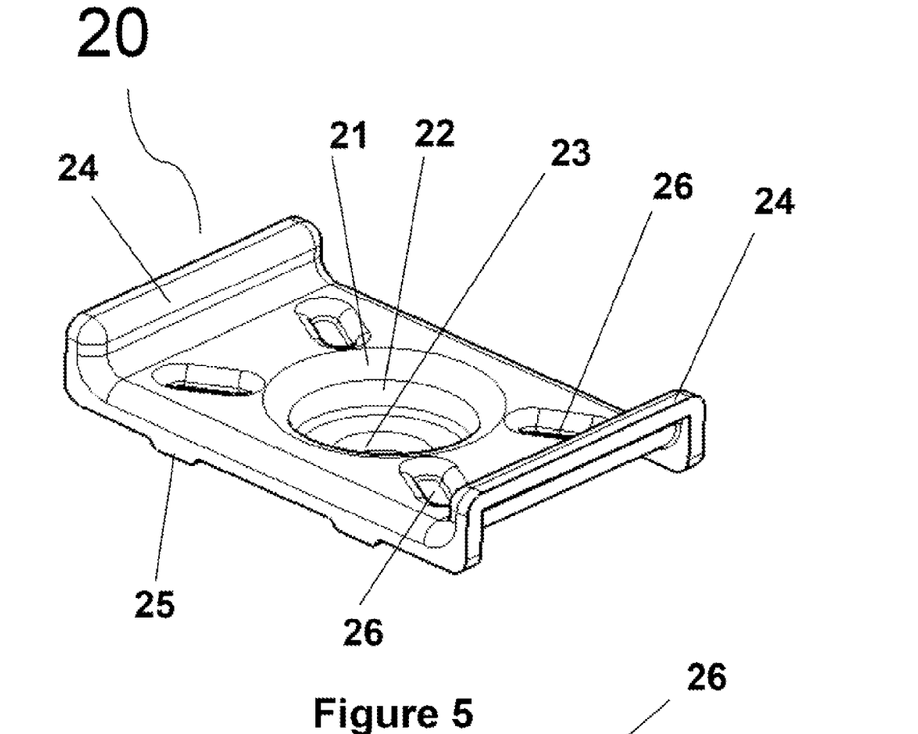
FIG. 5: 3-dimensional view of the lower piece of the said rotatable load-bearing top plate.
Figure 6:
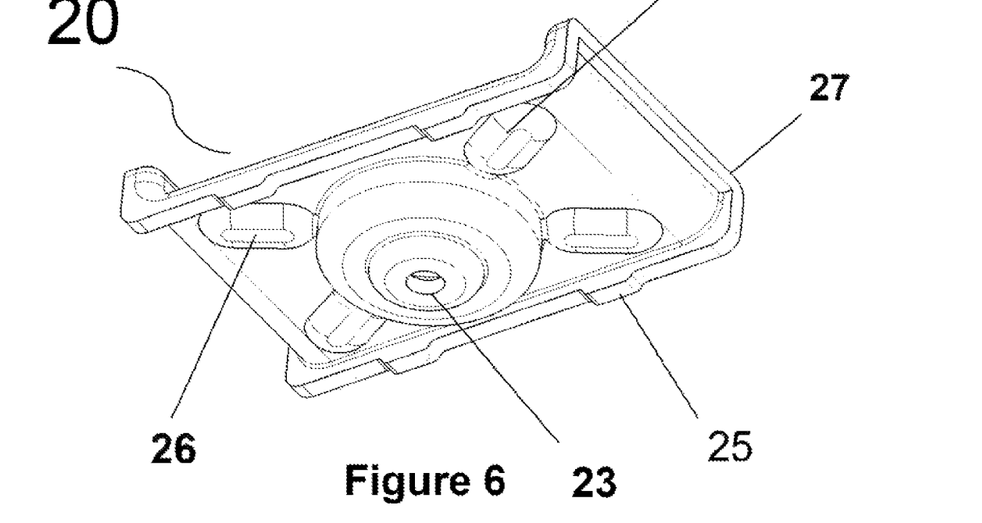
FIG. 6: 3-dimensional view of the lower piece of the said rotatable load-bearing top plate from bottom.

Another major integral part of the invention is upper piece (20). 3-Dimensional view of the mentioned upper piece (20) is shown in FIG. 5. Upper piece (20) is the part of the lifting jack (1) where directly contacts a vehicle or a load to be lifted. There are cylindrical slots which are positioned one after the other and get smaller in size consecutively in the mid section of the upper piece (20). They are, in succession, Upper cylindrical slot (21), lower cylindrical slot (22) and pin hole (23). There are two upper plate lugs (24) extending upward at both edges of upper piece (20). There are two lugs (25) hanging downward from both edges of the upper piece (20). In FIG. 6, configuration of the mentioned lugs (25) can be easily seen from 3-dimensional view of the upper piece (20), where it is projected from the bottom.

During carrying out the installation of the load-bearing top plate (10), firstly lower piece (30) is positioned on the upper supports (4) and the installation operation of the lower piece (30) is completed by inserting fastening elements (7) into the installation holes (32) on the lower piece (30). Then, upper piece (20) is placed over lower piece (30). The important point here is that the cylindrical forms (35,36,37) nested in each other successively on the lower piece (30) must resemble the same structure with those cylindrical forms (21,22,23) nested in each other successively on the upper bearing piece (20) and the two pieces mentioned (20, 30) must fit each other when upper piece (20) is placed over the lower piece (30). Thus, upper piece (20) can perform swiveling motion over lower piece (30). Later, pin (40) around which it is equipped with a pushing element (50) is inserted into the holes (23,37) positioned in the mid sections of lower piece (30) and upper piece (20) and then installation is completed.

Another important point here is V-ridges (34) which limit the swiveling motion in question and sort of locks the system by ensuring stepwise transition. As it is more clearly seen in the FIG. 4, there are V-ridges formed at the end sections of lower piece (30) and as it is more clearly seen in the FIG. 6 that there are lugs (25) at the edge of upper piece (20). On the mentioned lugs (25) there is a recessed form which allows it to fit as a V-ridge (34) belonging to the lower piece (30).

When lifting jack is in no load condition, i.e. free of load, the mentioned pushing element (50) maintains the upper piece (20) at certain height and in this way, upper piece (20) can swivel 360 degrees around its axis even though there are some triangular ridges (34) on the upper piece (20).

While lifting a vehicle with a jack (1) equipped with a swivel load-bearing top plate (10) of the invention, if the point on the front axle is chosen as the jacking point, then upper cylindrical slot (21) is used. If the point on the rear axle is chosen to be the jacking point, lifting operation is accomplished over upper surface of the upper piece (20) and upper plate Jugs (24). In addition to these, lifting operations by applying lifting jack (1) to different jacking points of the vehicle are also possible because of the swiveling capability of the upper piece (20).

Figure 7:
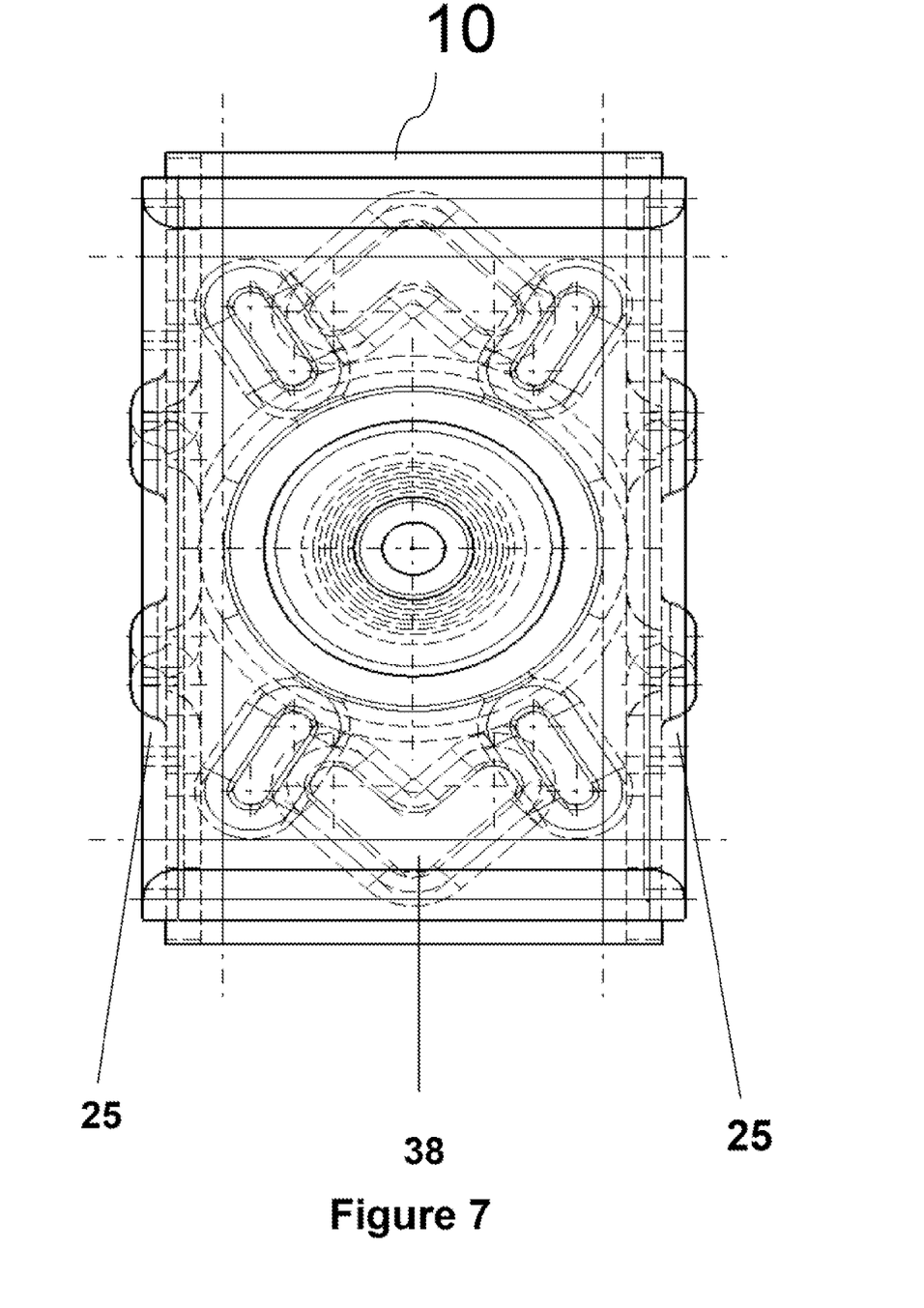
FIG. 7: Top view of the said rotatable load-bearing top plate in profile (Lower piece is positioned parallel to upper piece).

Top view of the said rotatable load-bearing top plate (10) in profile is shown in FIG. 7. In this sample figure, lower piece (30) and upper piece (20) are parallel to each other and in a position placed one over the other. In this position, during load lifting operation, upper piece (20) fits into the lower piece (30) by compressing pushing element (50) at the bottom side as lifting lack rises upward, and at the same time, V-ridge (34) located at both ends of the upper surface (33) of the lower piece (30) fits into the gap between the slots (26) at the bottom of upper piece (20) and locks the system. In this way, during lifting operation, safety is assured by preventing accidental or unintended swiveling of the load-hearing top plate (10) of jack (1).

Figure 8:
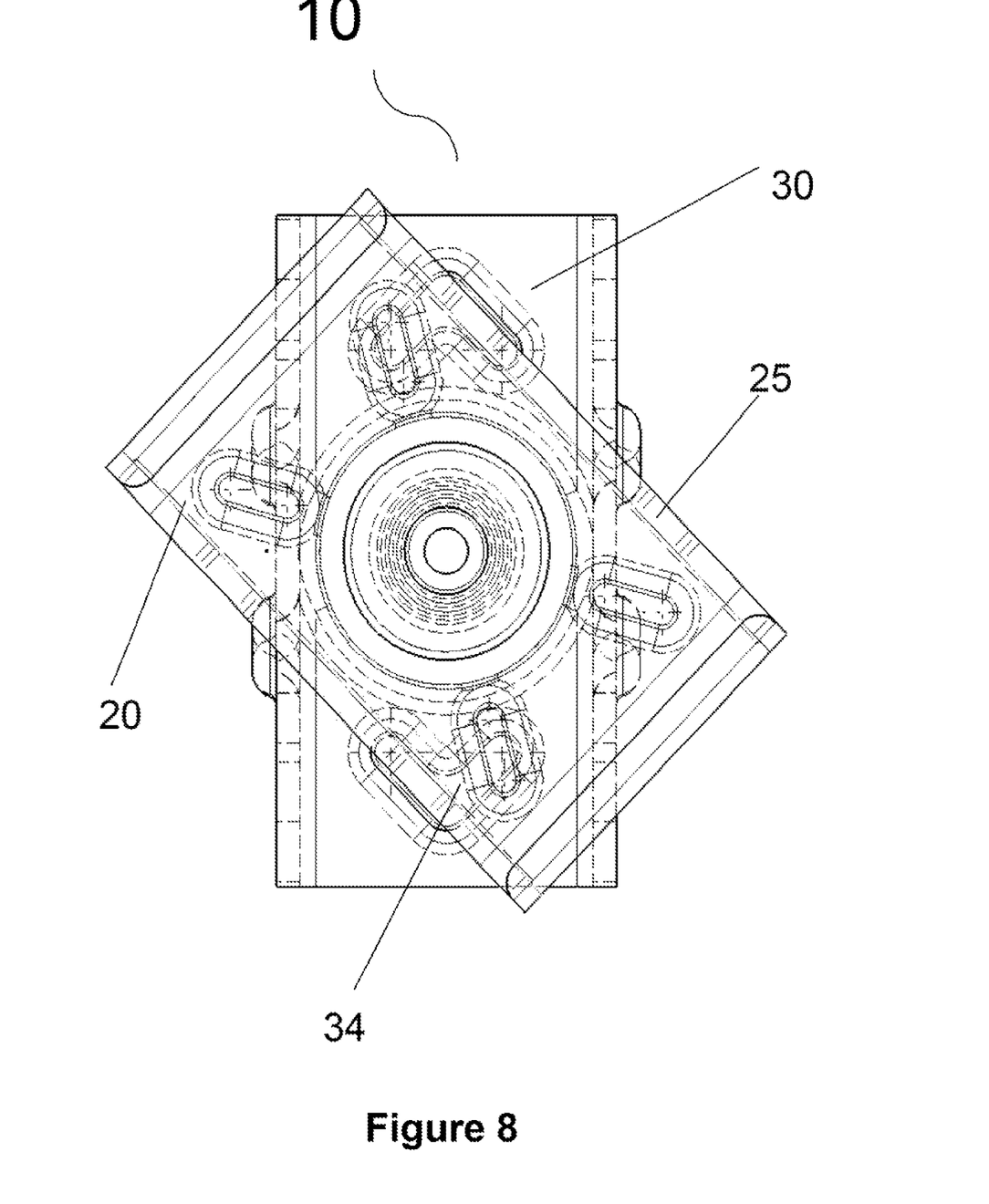
FIG. 8: Top view of the said rotatable load-bearing top plate in profile (Upper piece is shown as rotated).

In FIG. 8, viz. top view of the said swivel top plate system in profile is an example of use of upper piece (20) as rotated. In this position, during lifting operation, upper piece (20) is rotated until lifting jack its into the jacking point on the vehicle and raised with jack (1). Pushing element (50) is compressed for a certain period and upper piece (20) fits into lower piece (30). In this position, V-ridge (34) on the lower piece (30) act as an obstruction for the edges of the upper piece (20) and this way prevents it from switching over to straight position under load.

The invention claimed is:

1. A load-bearing assembly for use with a jack used with a vehicle, the load-bearing assembly comprising:
    a load-bearing plate having a lower piece and an upper piece, said upper piece adapted to be in contact with the vehicle, said upper piece being rotatable over said lower piece so as to lock in place;
    a pin connecting said lower piece and said upper piece; and
    a pushing element inserted around said pin, said lower piece having V-ridges formed at opposite end of an upper surface thereof so as to limit the rotation of said upper piece with respect to said lower piece in a stepwise manner, said upper surface of said lower piece adapted to contact upper supports of the jack, said upper surface having an upper centering slot and a lower centering slot and a pin hole nested in each other in succession and which have progressively smaller diameters, said lower piece having a lug extending downwardly from said upper surface, said lug comprising a pair of lugs extending downwardly from opposite edges of said upper piece, each of said pair of lugs having holes formed therein.

2. The load-bearing assembly of claim 1, said upper piece having an upper cylindrical slot and a lower cylindrical slot and a pin hole descending order and nested in each other so as to allow said upper piece to be centered when fitted in said lower piece.

3. The load-bearing assembly of claim 2, said upper piece having a pair of lugs extending upwardly from opposite sides thereof.

4. The load-bearing assembly of claim 3, said upper piece having another pair of lugs extending downwardly therefrom.

5. The load-bearing assembly of claim 1, said pushing element being a spring.

\* \* \* \* \*